United States Patent Office 3,178,435
Patented Apr. 13, 1965

3,178,435
NEW PYRIDINIUM COMPOUNDS
Adrian Marxer, Muttenz, Switzerland, assignor to Ciba Corporation, New York, N.Y., a corporation of Delaware
No Drawing. Filed Feb. 23, 1962, Ser. No. 175,355
Claims priority, application Switzerland, Feb. 27, 1961, 2,328/61; Dec. 1, 1961, 14,012/61
14 Claims. (Cl. 260—290)

The present invention relates to new pyridinium compounds. More especially it concerns N-phenyl-lower alkyl-pyridinium compounds whose pyridine ring is substituted by an alkyl radical containing at least 5 carbon atoms and whose phenyl radical contains at least one halogen atom and/or a nitro group, in the first place their salts.

The new compounds may contain further substituents, for example in the phenyl radical lower alkyl, alkoxy or free or esterified hydroxyl groups or, as mentioned above, halogen atoms or nitro groups, and/or in the pyridine nucleus, for example, lower alkyl radicals.

The alkyl radical containing at least 5 carbon atoms is, for example, an unbranched or branched alkyl radical which may contain, for example, 5 to 22 carbon atoms and which may be bound in any desired position such, for example, as a corresponding pentyl, hexyl, heptyl, octyl, nonyl, decyl, undecyl, dodecyl, tridecyl, heptadecyl or heneicosyl radical, and is above all the n-octyl, n-nonyl, n-decyl or n-undecyl group. This alkyl radical is advantageously in position 4 of the pyridine ring.

The phenyl-lower alkyl radical is for example a phenylethyl radical or preferably a benzyl radical.

As halogen atoms there may be mentioned above all chlorine, bromine and iodine. Suitable lower alkyl, alkoxy or acyloxy substituents are, for example, those which contain 1 to 4 carbon atoms, such as methyl, ethyl, propyl, isopropyl, butyl, secondary butyl, corresponding alkoxy groups or lower alkanoyloxy groups such as acetoxy, propionyloxy or butyryloxy groups.

The new compounds possess valuable pharmacological properties in regard to which they are superior to analogous compounds with lower alkyl groups in the pyridine nucleus. Inter alia they are distinguished by a high antibacterial action, for example towards staphylococci and *Escherichia coli*, and by good fungicidal and anthelmintic action, for example, towards parasitic vermiculae. They also act towards parasitic protozoae, for example amoeboe. Accordingly, they may be used as disinfectants or preservatives or pharmacologically, or as medicaments for humans or animals for treating, for example, diseases caused by bacteria, fungi, parasitic protozoe or vermiculae, or as corresponding prophylactics. They are also useful as intermediates for the manufacture of medicaments or disinfectants.

Particularly valuable are compounds of the formula

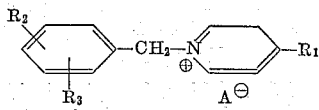

where $R_1$ represents an alkyl radical with 5 to 22, especially 5 to 13, preferably 8 to 11, carbon atoms; $R_2$ represents a halogen, preferably chlorine or bromine, atom or a nitro group; $R_3$ represents hydrogen or a halogen atom, more especially chlorine or bromine; and $A^\ominus$ represents an anion, more especially the anion of a hydrohalic acid or of one of the acids specified below.

Special mention because of their high activity towards the pathogens mentioned above deserve the compounds of the formula

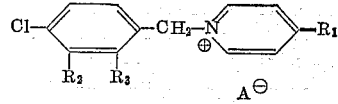

where $R_1$ represents an n-octyl, n-nonyl, n-decyl or n-undecyl radical; one of the radicals $R_2$ and $R_3$ represents a chlorine atom and the other a hydrogen atom; and $A^\ominus$ represents an anion—above all the N-(3:4-dichlorophenylmethyl)-4-n-octyl pyridinium salts, the N-(2:4-dichlorophenyl-methyl)-4-n-octyl pyridinium salts, the N-(3:4-dichlorophenyl-methyl)-4 - n - undecyl pyridinium salts and especially the N-(3:4-dichlorophenyl-methyl)-4-n-nonyl pyridinium salts, more especially the halides, such as chlorides, thereof.

The new compounds are obtained in known manner, for example by quaternating a pyridine substituted by an alkyl group with at least 5 carbon atoms with a reactively esterified phenyl-lower alkanol whose phenyl nucleus contains at least one halogen atom and/or a nitro group.

Reactive esters are above all those of strong inorganic or organic acids, above all of the hydrohalic acids, for example hydrochloric, hydrobromic or hydriodic acid, or of sulfuric acid, or of organic sulfonic acids, for example aromatic or aliphatic sulfonic acids, such as benzenesulfonic or toluenesulfonic acids.

The reaction is carried out in the conventional manner in the absence or advantageously in the presence of a diluent or solvent, advantageously at an elevated temperature.

Depending on the reaction conditions used the new compounds are obtained in the form of the free bases or of the quaternary salts.

Quaternary ammonium salts can be converted into the free bases, for example by treating an ammonium halide with freshly precipitated silver oxide, or by treating an ammonium sulfate with barium hydroxide solution, or with the use of a basic ion exchanger. From the free bases other ammonium salts can be prepared by reaction with acids. This exchange can alternatively be carried out directly with the use of a suitable ion exchanger.

As examples of acids there may be mentioned hydrohalic acids, for instance hydrochloric or hydrobromic acid, perchloric acid, nitric acid or thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, embonic acid, methanesulfonic, ethanesulfonic, hydroxyethanesulfonic, benzenesulfonic acid, halogen-benzenesulfonic acids, para-toluenesulfonic, naphthalenesulfonic or sulfanilic acid.

The invention also relates to modifications of the process in which a compound obtainable as intermediate at any stage of the process is used as starting material and the remaining process steps are carried out, or the process is discontinued at any stage, or in which a starting material is formed under the reaction conditions.

The new compounds can be used as disinfectants or preservatives, for example for disinfecting the skin, instruments, surgical dressings, laundered articles or the like, and also for disinfecting or preserving victuals or animal fodder. They may be used by themselves or in admixture with the conventional extenders or vehicles. They may also be used as medicaments, for example in the form of pharmaceutical preparations containing said compounds in admixture or conjunction with a solid or liquid organic or inorganic pharmaceutical excipient suitable for local, enteral (for example oral) or parenteral administration. Suitable excipients are substances that do not react with the new compounds such, for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, ointments, creams, tablets, dragees or capsules, or in liquid form, solutions, suspensions or emulsions. They may be sterilized and/or may contain assistants such as preserving, stabilizing, wetting or emulsifying agents, salts for regulating the osmotic pressure, or buffers. They may also contain other therapeutically valuable substances. The new compounds may also be used in veterinary medicine, for example in one of the forms mentioned above, or in animal husbandry in the form of fodder or of additives to fodder. In this case, for example, the conventional extenders and diluents or animal fodders respectively are used.

The starting materials are known or can be manufactured in known manner.

The following examples illustrate the invention.

Example 1

In a flask provided with stirrer 39.1 grams of 3:4-dichlorobenzyl chloride are mixed with 38.3 grams of 4-n-octylpyridine and heated in an oil bath for 5 hours at 150° C. The resulting hard melt is recrystallized from 100 cc. of a 9:1-mixture of acetone and alcohol. The resulting N - (3:4 - dichlorophenyl-methyl)-4-n-octyl pyridinium chloride of the formula

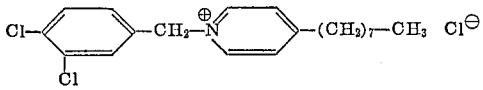

melts at 156 to 158° C.

Example 2

A mixture of 39.1 grams of 3:4-dichlorobenzyl chloride and 33.0 grams of 4-n-hexylpyridine is heated with stirring in an oil bath for 5 hours at 150° C. The resulting product is recrystallized from 200 cc. of a 9:1-mixture of acetone and alcohol, to yield the N-(3:4-dichlorophenyl-methyl)-4-n-hexyl pyridinium chloride of the formula

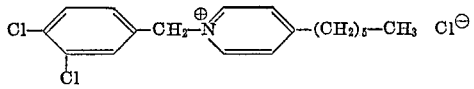

melting at 160 to 162° C.

Example 3

A mixture of 19.6 grams of 2:4-dichlorobenzyl chloride and 16.5 grams of 4-n-hexylpyridine is heated with stirring in an oil bath to 150° and then maintained for 3 hours at 150° C. The resulting reaction mixture is stirred with 100 cc. of a 1:1-mixture of acetone and ethyl acetate and the precipitated crystals are isolated, to yield the N-(2:4-dichloro-phenyl-methyl)-4-n-hexyl pyridinium chloride of the formula

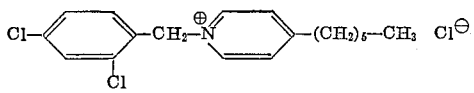

melting at 133 to 136° C.

Example 4

39.1 grams of 2:4-dichlorobenzyl chloride and 38.3 grams of 4-n-octylpyridine are stirred for 5 hours at 150° C. The crystalline mixture is stirred with 150 cc. of acetone, suctioned off and recrystallized from a large volume of acetone, to yield the N-(2:4-dichlorophenyl-methyl)-4-n-octyl pyridinium chloride of the formula

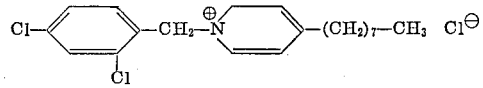

melting at 140 to 142° C.

Example 5

A solution of 34.3 grams of ortho-nitrobenzyl chloride and 38.2 grams of 4-n-octylpyridine in 75 cc. of butanol is refluxed with stirring for 5 hours. The butanol is then evaporated in vacuo and the residue is dissolved in 75 cc. of a 1:3-mixture of acetone and ethyl acetate, whereupon crystallization sets in. The whole is suction-filtered and yields the N-(2-nitrophenyl-methyl)-4-n-octyl pyridinium chloride of the formula

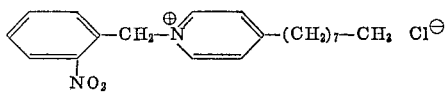

melting at 120 to 124°.

Example 6

34.3 grams of para-nitrobenzyl chloride and 38.2 grams of 4-n-octylpyridine in 75 cc. of butanol are heated at the boil for 5 hours. The butanol is then evaporated in vacuo and the residue dissolved in 75 cc. of ethyl acetate. On cooling the N-(4-nitrophenyl-methyl)-4-n-octyl pyridinium chloride of the formula

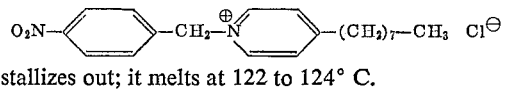

crystallizes out; it melts at 122 to 124° C.

Example 7

A solution of 34.3 grams of ortho-nitrobenzyl chloride and 33.0 grams of 4-n-hexylpyridine in 75 cc. of butanol is maintained with stirring on an oil bath for 5 hours at 150° C. The butanol is then evaporated in vacuo and the residue dissolved in 100 cc. of a 1:1-mixture of acetone and ethyl acetate and pasted. When crystallization has set in, another 100 cc. of ethyl acetate are added. The resulting crystalline N-(2-nitrophenyl-methyl)-4-n-hexyl pyridinium chloride of the formula

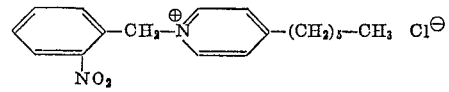

melts at 143° to 145° C.

Example 8

34.3 grams of para-nitrobenzyl chloride and 33.0 grams of 4-n-hexylpyridine in 75 cc. of butanol are refluxed for 5 hours. The whole is then evaporated in vacuo and the residue taken up in 100 cc. of ethyl acetate, whereupon it disintegrates in crystalline form. After having been filtered off and washed with ethyl acetate the crystals melt at 128 to 131° C.; they form the N-(4-nitrophenyl-methyl)-4-n-hexyl pyridinium chloride of the formula

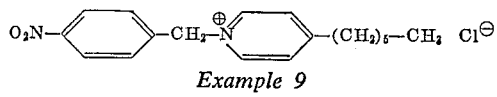

Example 9

39.1 grams of 3:4-dichloro-benzyl chloride and 41.06 grams of 4-n-nonylpyridine are mixed and heated for 5 hours at 150° C. in an oil bath. The reaction product is recrystallized from 125 cc. of acetone and 5 cc. of alcohol. There is obtained N-(3:4-dichlorophenyl-methyl)-4-n-nonylpyridinium chloride of the formula

melting at 159–160° C.

The 4-n-nonylpyridine used as starting material is prepared as follows:

92 grams of γ-picoline and 40 grams of pulverized sodamide are stirred together, the temperature rising to about 45° C. After 2 hours, 116 grams of octylbromide are added dropwise at an internal temperature of 30–40° C. with ice-water cooling; the reaction mixture is stirred for 2 hours at room temperature and for 1 hour at 90° C. The sodium salts are decomposed with water while cooling with ice, the organic layer taken up in ether, dried and subjected to fractional distillation to yield 4-n-nonyl pyridine boiling at 160–165° C. under 12 mm. of pressure and 4-n-heptadecyl-(9')-pyridine boiling at 175–180° C. under 0.01 mm. of pressure.

Example 10

39.1 grams of 3:4-dichlorobenzyl chloride and 46.7 grams of 4-n-undecyl pyridine are mixed and heated at 150° C. for 5 hours in an oil bath. The reaction product is recrystallized from 125 cc. of acetone and 5 cc. of alcohol to yield N-(3:4-dichlorophenyl-methyl)-4-n-undecyl pyridinium chloride of the formula

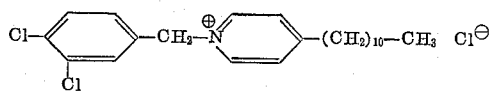

melting at 167–169° C.

The 4-n-undecyl-pyridine used as starting material may be obtained as follows:

92 grams of γ-picoline and 40 grams of pulverized sodamide are stirred together, the temperature rising to 45° C. After 2 hours, 133 grams of n-decyl bromide are added dropwise at an internal temperature of 30–40° C. with ice-water cooling; the reaction mixture is stirred for 2 hours at room temperature and for 1 hour at 90° C. The sodium salts are decomposed with water while cooling in ice, the organic layer taken up in ether, dried and subjected to fractional distillation to yield 4-n-undecyl pyridine boiling at 185–190° C. under 12 mm. of pressure and 4-n-heneicosyl-(11')-pyridine boiling at 213–214° C. under 0.01 mm. of pressure.

Example 11

39.1 grams of 3:4-dichlorobenzyl chloride and 52.2 grams of 4-n-tridecyl-pyridine are heated for 5 hours at 150° C. in an oil bath. The reaction product is recrystallized from 125 cc. of acetone and 5 cc. of alcohol. There is obtained N-(3:4-dichlorophenyl-methyl)-4-n-tridecyl-pyridinium chloride of the formula

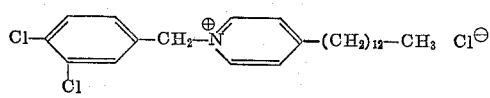

melting at 163–165° C.

Example 12

17.5 grams of 4-chlorophenyl-ethyl bromide and 19.1 grams of 4-n-octyl-pyridine are heated at 150° C. for 5 hours in an oil bath. The reaction mixture crystallizes on 150 cc. of acetone being added. There is obtained N - (4 - chlorophenyl-ethyl) - 4 - n - octyl-pyridinium chloride of the formula

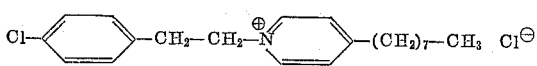

melting at 122–124° C.

Example 13

10.7 grams of 3:4-dichlorobenzyl chloride and 15.9 grams of 4-n-heptadecyl-(9')-pyridine are mixed and heated for 5 hours at 150° C. in an oil bath. The cooled reaction product is then extracted three times with boiling ether. The residue which is insoluble in ether is N- (3:4 - dichlorobenzyl) - 4 - n - heptadecyl - (9') - pyridinium chloride of the formula

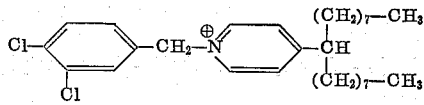

It is readily soluble in polyethyleneglycol.

The 4-n-heptadecyl-(9')-pyridine used as starting material may be obtained as described in Example 9.

Example 14

18.7 grams of 4-n-heneicosyl-(11')-pyridine and 10.7 grams of 3:4-dichlorobenzyl chloride are heated for 5 hours at 150° C. in an oil bath. The viscous reaction product is extracted 3 times with boiling ether with stirring. The residue which is insoluble in ether is N-(3:4-dichlorobenzyl) - 4 - n - heneicosyl - (11') - pyridinium chloride of the formula

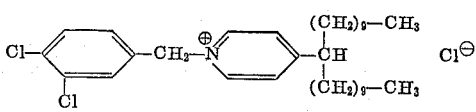

It is readily soluble in polyethyleneglycol.

The 4-n-heneicosyl-(11')-pyridine used as starting material may be obtained as described in Example 10.

What is claimed is:

1. A compound of the formula

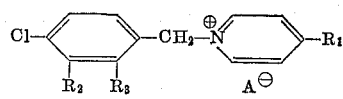

in which $R_1$ represents alkyl with 8 to 21 carbon atoms and one of $R_2$ and $R_3$ represent chlorine and the other hydrogen, and $A^\ominus$ is an anion.

2. A compound of the formula

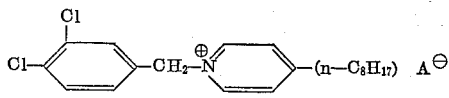

wherein $A^\ominus$ is an anion.

3. A compound of the formula

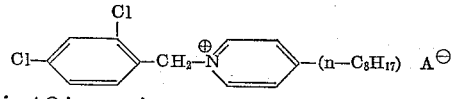

wherein $A^\ominus$ is an anion.

4. A compound of the formula

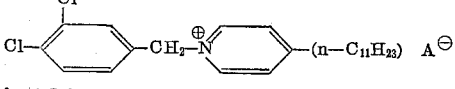

wherein $A^\ominus$ is an anion.

5. A compound of the formula

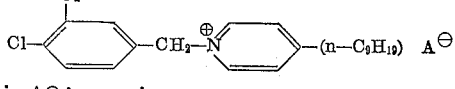

wherein $A^\ominus$ is an anion.

6. N - (3:4 - dichlorophenyl-methyl) - 4 - n - nonyl-pyridinium halide.

7. N - (3:4 - dichlorophenyl - methyl) - 4 - n - octyl-pyridinium chloride.

8. N - (3:4 - dichlorophenyl - methyl) - 4 - n - hexyl-pyridinium chloride.

9. N - (2:4 - dichlorophenyl-methyl) - 4 - n - hexyl-pyridinium chloride.

10. N - (2:4 - dichlorophenyl-methyl) - 4 - n - octyl-pyridinium chloride.

11. N - (3:4 - dichlorophenyl-methyl) - 4 - n - nonyl-pyridinium chloride.

12. N - (3:4 - dichlorophenyl-methyl) - 4 - n - undecyl-pyridinium chloride.

13. N - (3:4 - dichlorophenyl-methyl) - 4 - n - tridecyl-pyridinium chloride.

14. N - (4 - chlorophenyl-ethyl) - 4 - n - octyl-pyridinium halide.

References Cited by the Examiner
UNITED STATES PATENTS 2,609,270  9/52  Couper _____ 260—290 XR
2,632,761  3/53  Cheney _____ 260—290

OTHER REFERENCES

Krohnke et al.: Chem. Abstracts, volume 33, column 1691 (1939).

Krohnke et al.: Chem. Abstracts, volume 47, columns 1704–5 (1953).

Krohnke et al.: Chemische Berichte, vol. 85, pp. 368–376 (1952).

Krohnke et al.: Annalen der Chemie, vol. 600 (1956), pp. 184–185.

WALTER A. MODANCE, *Primary Examiner.*

D. T. McCUTCHEN, *Examiner.*